US 8,820,945 B2

(12) United States Patent
Tsukagoshi

(10) Patent No.: US 8,820,945 B2
(45) Date of Patent: Sep. 2, 2014

(54) PROJECTOR AND CONTROL METHOD

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 13/315,504

(22) Filed: Dec. 9, 2011

(65) Prior Publication Data

US 2012/0147340 A1    Jun. 14, 2012

(30) Foreign Application Priority Data

Dec. 10, 2010    (JP) ................................. 2010-275457

(51) Int. Cl.
*G03B 21/14*    (2006.01)
*H04N 9/31*    (2006.01)
*G03B 3/12*    (2006.01)

(52) U.S. Cl.
CPC ................ *G03B 3/12* (2013.01); *H04N 9/3102* (2013.01); *G03B 21/142* (2013.01); *G03B 2205/0046* (2013.01)
USPC .......................................... 353/100; 359/460

(58) Field of Classification Search
USPC ........................ 353/100, 74, 69, 101; 359/460
See application file for complete search history.

(56) References Cited

U.S. PATENT DOCUMENTS

| 6,282,379 | B1 | 8/2001 | Ide et al. | |
| 6,592,228 | B1 * | 7/2003 | Kawashima et al. | 353/101 |
| 7,559,658 | B2 * | 7/2009 | Kamiya et al. | 353/101 |

FOREIGN PATENT DOCUMENTS

| JP | 05-011164 | * | 4/1991 | ............... G02B 7/06 |
| JP | 5-11164 A | | 1/1993 | |
| JP | 2000-081601 A | | 3/2000 | |
| JP | 2006-106581 A | | 4/2006 | |
| JP | 3820546 B | | 9/2006 | |
| JP | 2009-075147 A | | 4/2009 | |

OTHER PUBLICATIONS

Machine translation of JP 05-011164 (Dec. 6, 2013).*

* cited by examiner

*Primary Examiner* — Francis M Legasse, Jr.
*Assistant Examiner* — Jerry Brooks
(74) *Attorney, Agent, or Firm* — ALG Intellectual Property, LLC

(57) ABSTRACT

A projector includes a lens driving section that drives a lens section having a projection lens, an accepting section that accepts first control value indication information indicating a first control value including a drive instruction value of the lens section, a determining section that determines whether a drive instruction direction for the lens section is a first drive direction that is same as the last drive direction or a second drive direction that is different from the last drive direction, and a control section that drives the lens section by using a second control value whose drive instruction value is greater than the drive instruction value of the first control value in case that the drive instruction direction is the second drive direction.

5 Claims, 12 Drawing Sheets

| TYPE | DIRECTION | SETTING 1 | SETTING 2 | SETTING 3 |
|---|---|---|---|---|
| ZOOM | WIDE ANGLE | 5 | 10 | 15 |
| | TELEPHOTO | 5 | 10 | 15 |
| FOCUS | WIDE ANGLE | 10 | 20 | 30 |
| | TELEPHOTO | 10 | 20 | 30 |
| LENS SHIFT | UP | 30 | 60 | 90 |
| | DOWN | 20 | 40 | 60 |
| | LEFT | 25 | 50 | 75 |
| | RIGHT | 25 | 50 | 75 |

FIG. 10

| TYPE | DIRECTION | FIRST CONTROL VALUE IN SETTING 2 | SECOND CONTROL VALUE |
|---|---|---|---|
| ZOOM | WIDE ANGLE | 10 | 40 |
| | TELEPHOTO | 10 | 40 |
| FOCUS | WIDE ANGLE | 20 | 80 |
| | TELEPHOTO | 20 | 80 |
| LENS SHIFT | UP | 60 | 480 |
| | DOWN | 40 | 320 |
| | LEFT | 50 | 400 |
| | RIGHT | 50 | 400 |

FIG. 11

PROJECTOR AND CONTROL METHOD

The entire disclosure of Japanese Patent Application No. 2010-275457, filed Dec. 10, 2010 is expressly incorporated by reference herein.

BACKGROUND

1. Technical Field

The present invention relates to projectors and control methods.

2. Related Art

For example, in JP-A-2009-75147, a projector having a motorized zoom function, a motorized focus function, and a motorized lens shift function is described. In general, these functions are realized by driving a motor that drives a lens section including a projection lens. When the user uses such a projector, the user can adjust the size, the display position, etc. of an image by pressing an operation key (for example, a numeric key or a direction key) provided in a remote controller or a projector main body. In the case of long-pressed key operation in which the time in which the operation key is being pressed exceeds a prescribed time, the projector continuously drives the motor while the operation key is being pressed; in the case of normal operation in which the time in which the operation key is being pressed is equal to or shorter than the prescribed time, the projector drives the motor for a time corresponding to a prescribed value. More specifically, the user can make fine adjustments to the position etc. of the image by pressing the operation key several times, each press being performed for a short period of time.

However, when the amount of driving of the motor by one normal operation of the operation key is fixed, the projector sometimes cannot deal appropriately with the requests of the user, the projection status of the image, and the like. For example, there are a user who desires to make fine adjustments to the image even when the movement of the motor is slow and a user who desires to move the motor quickly even if the image changes significantly. Furthermore, since a gear is used in a drive mechanism of the lens section, backlash occurs. For example, the user has to press the operation key several times to move the lens section in one direction (for example, to the right at the time of motorized lens shift) and then move the lens section in the opposite direction (in this case, to the left).

SUMMARY

An advantage of some aspects of the invention is to solve at least part of the problems described above and the invention can be implemented as the following forms or aspects.

A projector according to an aspect of the invention includes: a lens driving section that drives a lens section having a projection lens; an accepting section that accepts first control value indication information indicating a first control value; a determining section that determines whether a drive instruction direction for the lens section is a first drive direction that is same as the last drive direction of the lens section or a second drive direction that is different from the last drive direction of the lens section; and a control section that controls the lens driving section by using a second control value whose drive instruction value of the lens section is greater than the drive instruction value of the first control value for driving the lens section to the drive instruction direction by the lens driving section in case that the determining section determines that the drive instruction direction is the second drive direction.

A control method according to another aspect of the invention is a control method in a projector including a lens driving section that drives a lens section having a projection lens and an accepting section that accepts first control value indication information indicating a first control value, wherein the projector determines the first control value based on the first control value indication information, determines whether a drive instruction direction for the lens section is a first drive direction that is same as the last drive direction of the lens section or a second drive direction that is different from the last drive direction of the lens section, and controls the lens driving section by using the first control value for driving the lens section to the drive instruction direction by the lens driving section in case that determining that the drive instruction direction is the first drive direction, and controls the lens driving section by using a second control value whose drive instruction value of the lens section is greater than the drive instruction value of the first control value for driving the lens section to the drive instruction direction by the lens driving section in case that determining that the drive instruction direction is the second drive direction.

According to the aspects of the invention, the projector can drive the lens section in response to requests from the user by accepting the first control value indication information, determining the first control value, and driving the lens section by using the first control value. Moreover, according to the aspects of the invention, the projector can reduce the influence of backlash and increase responsiveness to an instruction for lens shift etc. by driving the lens section by using the second control value whose drive instruction value of the lens section is greater than the drive instruction value of the first control value in case that the drive instruction direction is the second drive direction. Therefore, the projector can improve the convenience of the user and perform control related to the movement of a projection lens more appropriately.

BRIEF DESCRIPTION OF THE DRAWINGS

The invention will be described with reference to the accompanying drawings, wherein like numbers reference like elements.

FIG. 10 is a diagram showing an example of a first control value in the first embodiment.

FIG. 11 is a diagram showing an example of a second control value in the first embodiment.

DESCRIPTION OF EXEMPLARY EMBODIMENTS

Hereinafter, embodiments of the invention which is applied to a projector will be described with reference to the drawings. It should be understood that the embodiments described below are not meant to limit the scope of the invention claimed in the appended claims in any way, and all the configurations described in the embodiments are not always necessary for means of the invention claimed in the appended claims for solving the problems.

First Embodiment

Figure 1:
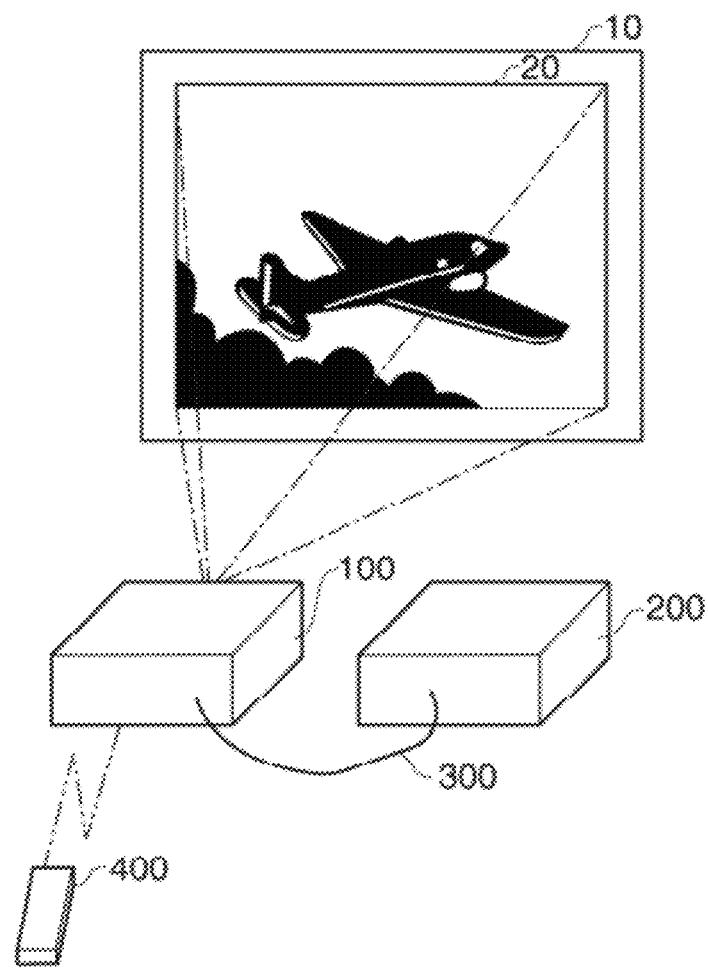
FIG. 1 is a diagram showing a projection status in a first embodiment.

FIG. 1 is a diagram showing a projection status in a first embodiment. A projector 100 receives an image signal from a DVD player 200 via an HDMI cable 300 and projects an image 20 onto a screen 10 based on the image signal. The user adjusts the focus, the size, the position, etc. of the image 20 by operating a remote controller 400. The projector 100 can make these adjustments by adjusting the position of a lens section (for example, a lens-barrel, a zoom lens, and a focus lens) having a projection lens. To drive the lens section in accordance with the setting made by the user and reduce the influence of backlash when the lens section is driven, the projector 100 of this embodiment has the function of accepting an instruction for a control value when the lens section is driven and the function of adjusting the driving of the lens section in the opposite direction.

Figure 2:
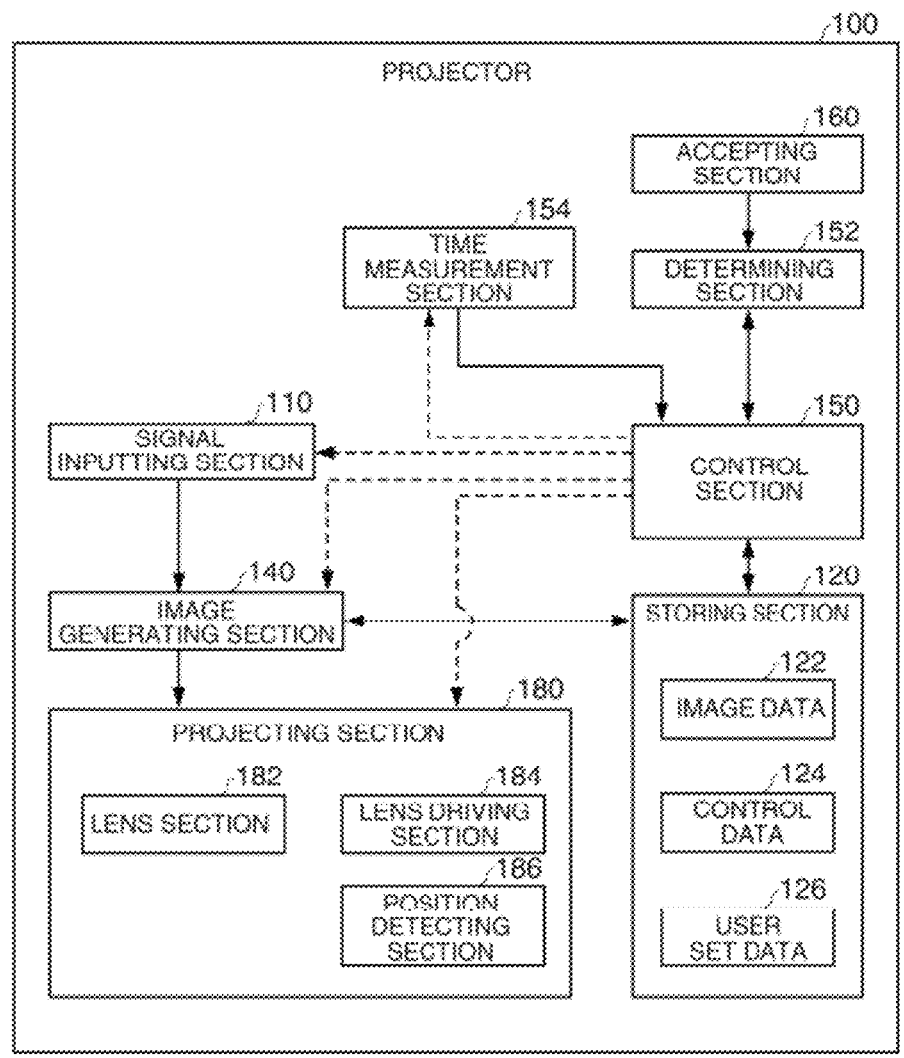
FIG. 2 is a functional block diagram of a projector in the first embodiment.

FIG. 2 is a functional block diagram of the projector 100 in the first embodiment. The projector 100 includes a signal inputting section 110 to which an image signal etc. from the DVD player 200 is input, a storing section 120, an image generating section 140, an accepting section 160 that accepts indication information from the remote controller 400, a determining section 152 that makes a determination etc. of the contents of the indication information, a time measurement section 154, a control section 150 that controls the time measurement section 154 etc., and a projecting section 180. The storing section 120 stores image data 122, control data 124, user set data 126, and the like. Moreover, the projecting section 180 includes a lens section 182, a lens driving section 184 that drives the lens section 182, and a position detecting section 186 that detects the position etc. of the lens section 182.

Figure 3:
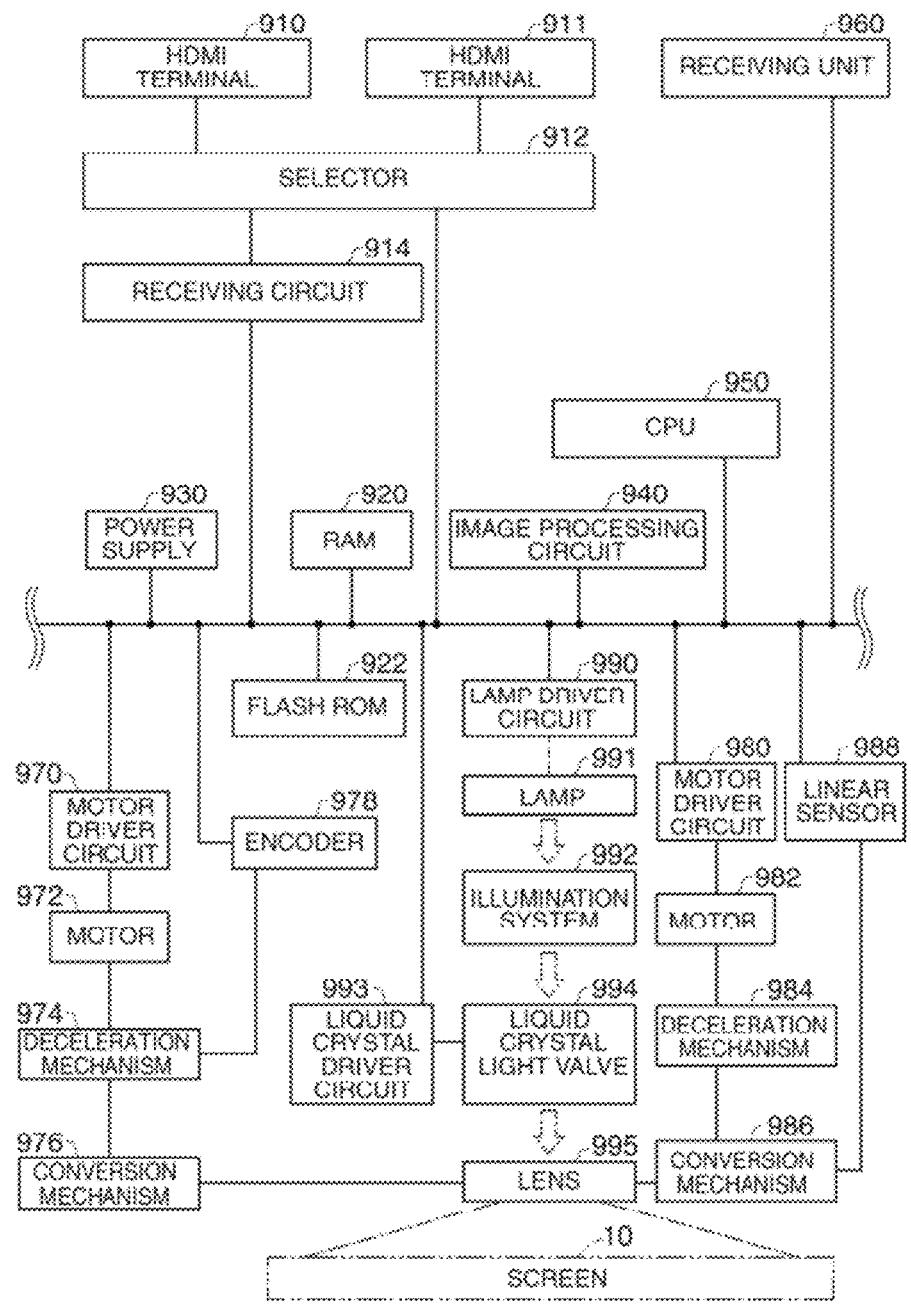
FIG. 3 is a hardware block diagram of the projector in the first embodiment.

FIG. 3 is a hardware block diagram of the projector 100 in the first embodiment. For example, the signal inputting section 110 may be HDMI terminals 910 and 911, a selector 912, a receiving circuit 914, and the like, the storing section 120 may be RAM 920, flash ROM 922, and the like, the image generating section 140 may be an image processing circuit 940 or the like, the control section 150, the determining section 152, and the time measurement section 154 may be a CPU 950 or the like, the accepting section 160 may be a receiving unit 960 or the like, and the projecting section 180 may be a lamp driver circuit 990, a lamp 991, an illumination system 992, a liquid crystal driver circuit 993, a liquid crystal light valve 994, a lens 995, and the like. Moreover, the projector 100 also has a power supply 930 or the like. Incidentally, the lens 995 is actually formed of a plurality of lenses such as a zoom lens, a focus lens, and a projection lens.

Furthermore, the lens driving section 184 for making focus adjustment and field angle (zoom) adjustment may be a motor 972, a motor driver circuit 970 for driving the motor 972, a deceleration mechanism 974 adjusting the rotational speed of the motor 972, a conversion mechanism 976 converting the rotational motion of the motor 972 into linear motion, and the like. The position detecting section 186 for this purpose may be an encoder 978 or the like that is connected to the deceleration mechanism 974 and acquires positional information of the lens 995 (the focus lens or the zoom lens) via the deceleration mechanism 974. Moreover, the lens driving section 184 for performing lens shift may be a motor driver circuit 980, a motor 982, a deceleration mechanism 984, a conversion mechanism 986, and the like. The position detecting section 186 for this purpose may be a linear sensor 988 or the like that is connected to the conversion mechanism 986 and acquires positional information of the lens 995 (the projection lens) via the conversion mechanism 986. As described above, the projector 100 has a hardware configuration for performing motorized zoom, focus, and lens shift.

Figure 4:
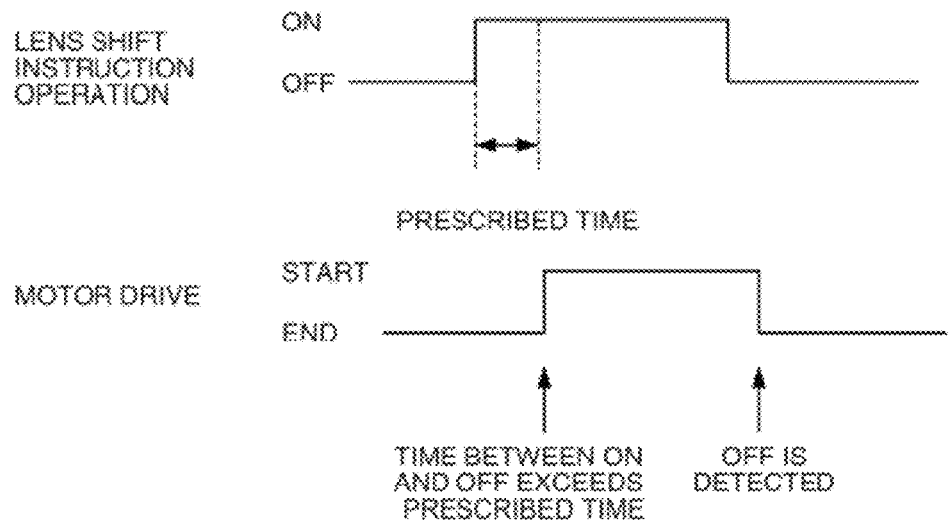
FIG. 4 is a diagram showing the relationship between long-pressed key operation and motor drive in the first embodiment.
Figure 5:
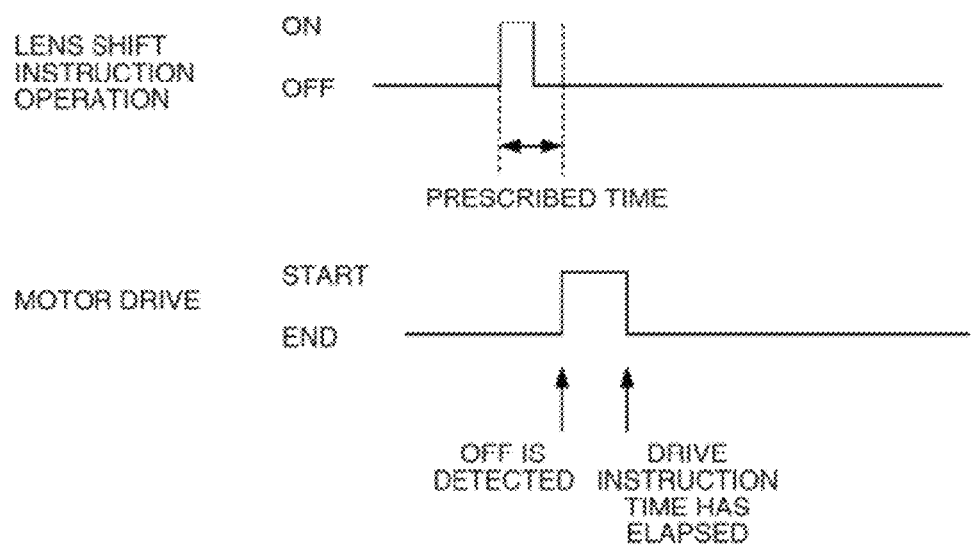
FIG. 5 is a diagram showing the relationship between normal operation and motor drive in the first embodiment.

The user can move the projection lens etc. in an intended direction and thereby adjust the position etc. of the image 20 by operating a direction key or the like of the remote controller 400. FIG. 4 is a diagram showing the relationship between long-pressed key operation and motor drive in the first embodiment. Moreover, FIG. 5 is a diagram showing the relationship between normal operation and motor drive in the first embodiment.

For example, the user can continuously drive the motor 982 and thereby continuously move the lens section 182 by setting the time from when a direction key for lens shift operation is pressed (turned on) till when the direction key is released (turned off) so as to be longer than a prescribed time or to be equal to or longer than the prescribed time. Moreover, for example, the user can drive the motor 982 in accordance with the number of operations of the direction key and thereby move the lens section 182 little by little by performing normal operation in which the time from when the direction key for lens shift operation is pressed till when the direction key is released is shorter than the prescribed time or equal to or shorter than the prescribed time. Here, the prescribed time is any time in the 0.1- to 1-second range, for example.

Figure 6:
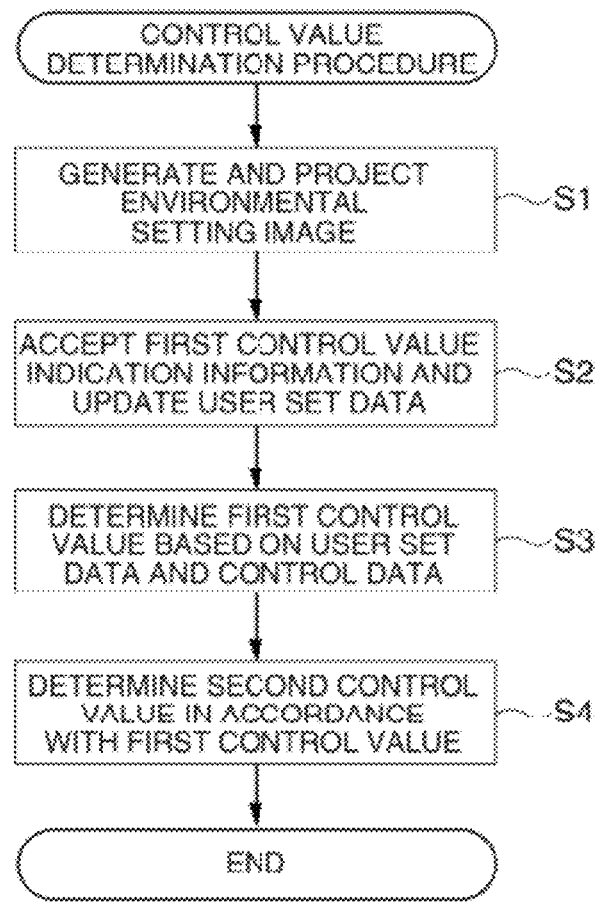
FIG. 6 is a flowchart showing an example of a control value determination procedure in the first embodiment.

The projector 100 determines a first control value as a control value (a drive instruction value) when the lens 995 is driven in the same direction at the time of normal operation described above, and determines a second control value as a control value when the lens 995 is driven in the opposite direction. Here, a procedure by which each control value is determined will be described. FIG. 6 is a flowchart showing an example of a control value determination procedure in the first embodiment.

The user operates the remote controller 400 and thereby issues a projection instruction to the projector 100 to project an environmental setting image (a control value accepting image). The control section 150 performs control to make the image generating section 140 generate the environmental setting image in accordance with the projection instruction accepted by the accepting section 160. In response to the control, the image generating section 140 generates the environmental setting image based on the image data 122 and the user set data 126, and the projecting section 180 projects the environmental setting image (step S1).

Figure 7:
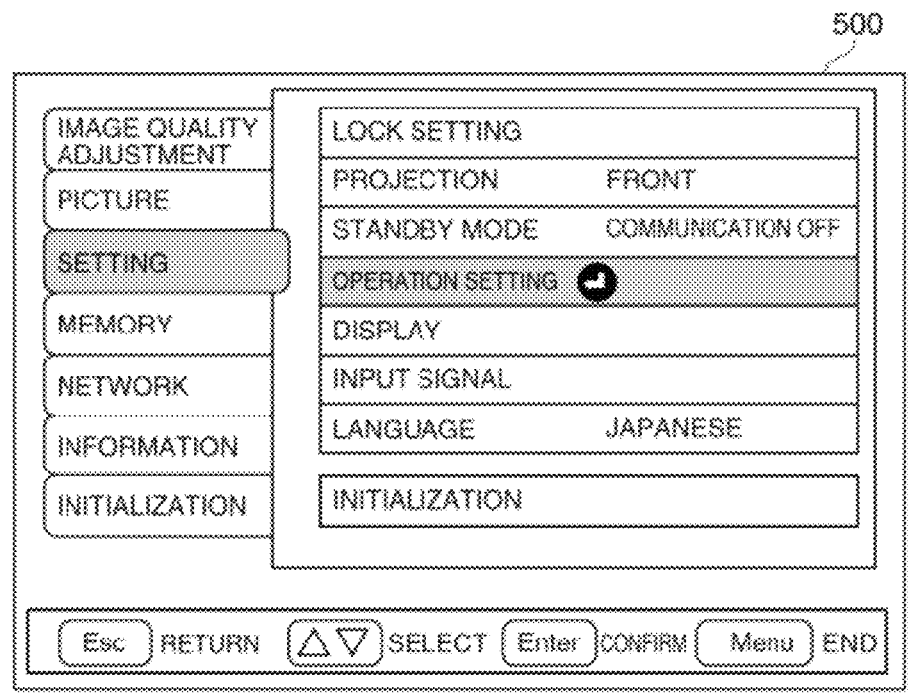
FIG. 7 is a diagram showing an example of an environmental setting image in the first embodiment.

FIG. 7 is a diagram showing an example of an environmental setting image 500 in the first embodiment. For example, the user makes the projector 100 project the environmental setting image 500 by pressing a menu key (not shown) provided in the remote controller 400. The environmental setting image 500 includes the following setting items: "image quality adjustment", "picture", "setting", "memory", "network", "information", and "initialization". Moreover, "setting" includes, as subordinate items thereof, "lock setting" by which the setting to lock the key operation of the projector 100 and a lens section adjustment is made, "projection" by which the setting of a method for projecting an image is made, "standby mode" by which the setting of network monitoring and control function at the time of standby is made, "operation setting" by which the setting of operation of the projector 100 is made, "display" by which the setting of the display position, the display color, etc. of the menu is made, "input signal" by which the setting of an input signal system such as NTSC or PAL is made, "language" by which the setting of a display language is made, and "initialization" by which the set value is initialized.

Figure 8:
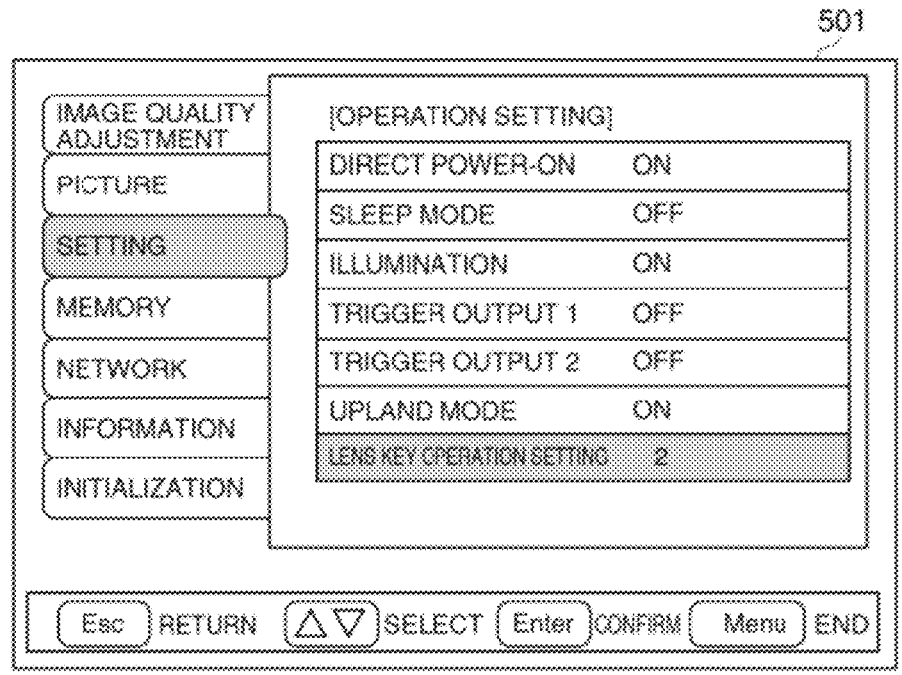
FIG. 8 is a diagram showing another example of the environmental setting image in the first embodiment.

Furthermore, FIG. 8 is a diagram showing an example of an environmental setting image 501 in the first embodiment. For example, the user makes the projector 100 project the environmental setting image 501 by selecting "operation setting" in the environmental setting image 500. The environmental setting image 501 includes the following items: "direct power-on" by which the setting as to whether or not the projector 100 starts to operate by the turn-on of a main power supply switch is made, "sleep mode" by which the setting as to whether or not the power supply is automatically turned off when a state in which no signal is supplied continues for a given period of time is made, "illumination" by which the setting as to whether or not an indicator provided in the projector 100 is turned off is made, "TriggerOut 1" and "TriggerOut 2" by which the setting as to whether or not a control signal controlling an external device is output is made, "upland mode" by which the setting as to whether or not the projector 100 is located at a height of 1500 m or more above sea level, and "lens key operation setting" by which the amount of adjustment at the time of lens adjustment performed by using a lens key is set.

Figure 9:
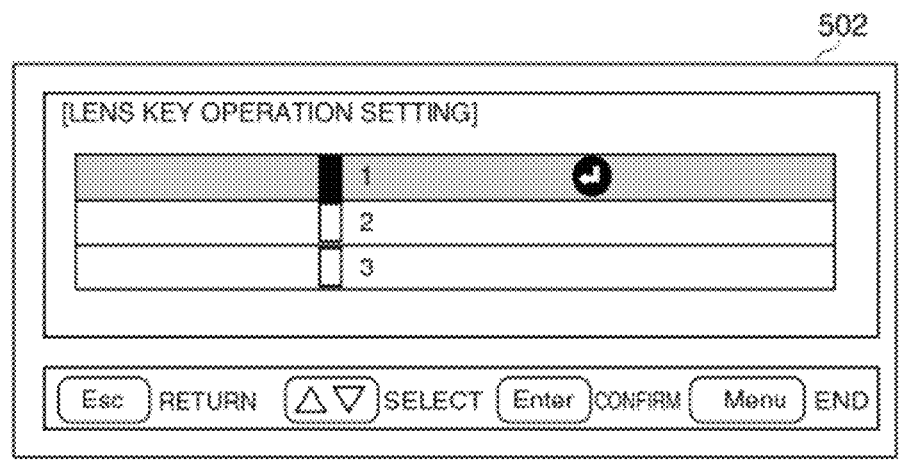
FIG. 9 is a diagram showing another example of the environmental setting image in the first embodiment.

In addition, FIG. 9 is a diagram showing an example of an environmental setting image 502 in the first embodiment. For example, the user makes the projector 100 project the environmental setting image 501 by selecting "operation setting" in "setting" in the environmental setting image 500. Moreover, for example, the user makes the projector 100 project the environmental setting image 502 by selecting "lens key operation setting" in the environmental setting image 501. Incidentally, in the environmental setting images 500 to 502, as guidance in operating the environmental setting images 500 to 502, keys for performing "return" to return to the superordinate item, "selection" to select a setting item, "confirm" to confirm the setting item, and "end" to end the projection of the environmental setting images 500 to 502 are displayed. Furthermore, the environmental setting images 500 to 502 may be OSD (on screen display) images.

The environmental setting image 502 includes images representing option "2" by which a standard value is used as the first control value, option "3" by which a value whose drive instruction value is greater than that of the standard value is used as the first control value, and option "1" by which a value whose drive instruction value is smaller than that of the standard value is used as the first control value. The user selects an intended option by operating the remote controller 400. The accepting section 160 accepts first control value indication information indicating the selection from the remote controller 400, and the control section 150 updates the user set data 126 so that the user set data 126 indicates the selection (step S2) and determines the first control value based on the user set data 126 and the control data 124 (step S3). Here, the setting of the first control value in accordance with each option will be described.

FIG. 10 is a diagram showing an example of the first control value in the first embodiment. A table shown in FIG. 10 is stored in the storing section 120 as part of the control data 124. In the table, control values in accordance with the type: zoom, focus, and lens shift, the drive direction, and the setting are set. Moreover, the above setting is determined in accordance with the option selected in the environmental setting image 502. For example, when option "2" is selected, "setting 2" is used as the first control value; when option "3" is selected, "setting 3" is used as the first control value; and when option "1" is selected, "setting 1" is used as the first control value.

Incidentally, in FIGS. 10 and 11, the numeric value represents the time (millisecond) of a drive instruction for the lens section 182. That is, the settings are made so that the time of a drive instruction becomes longer in the order of setting 3, setting 2, and setting 1. Moreover, as to "up" and "down" of lens shift, the settings are made so that the time of a drive instruction to perform upward lens shift is longer than the time of a drive instruction to perform downward lens shift.

Furthermore, the control section 150 determines the second control value in accordance with the determined first control value (step S4). FIG. 11 is a diagram showing an example of the second control value in the first embodiment. A method for determining the second control value may be a method by which a constant is added to the first control value, a method by which the first control value is multiplied by a constant, and the like. For example, when the type is lens shift, the control section 150 can determine the second control value by multiplying the first control value by 8. Incidentally, the second control value may be stored in the storing section 120 as part of the control data 124, or may be determined by an operation based on the first control value every time control is performed.

Figure 12:
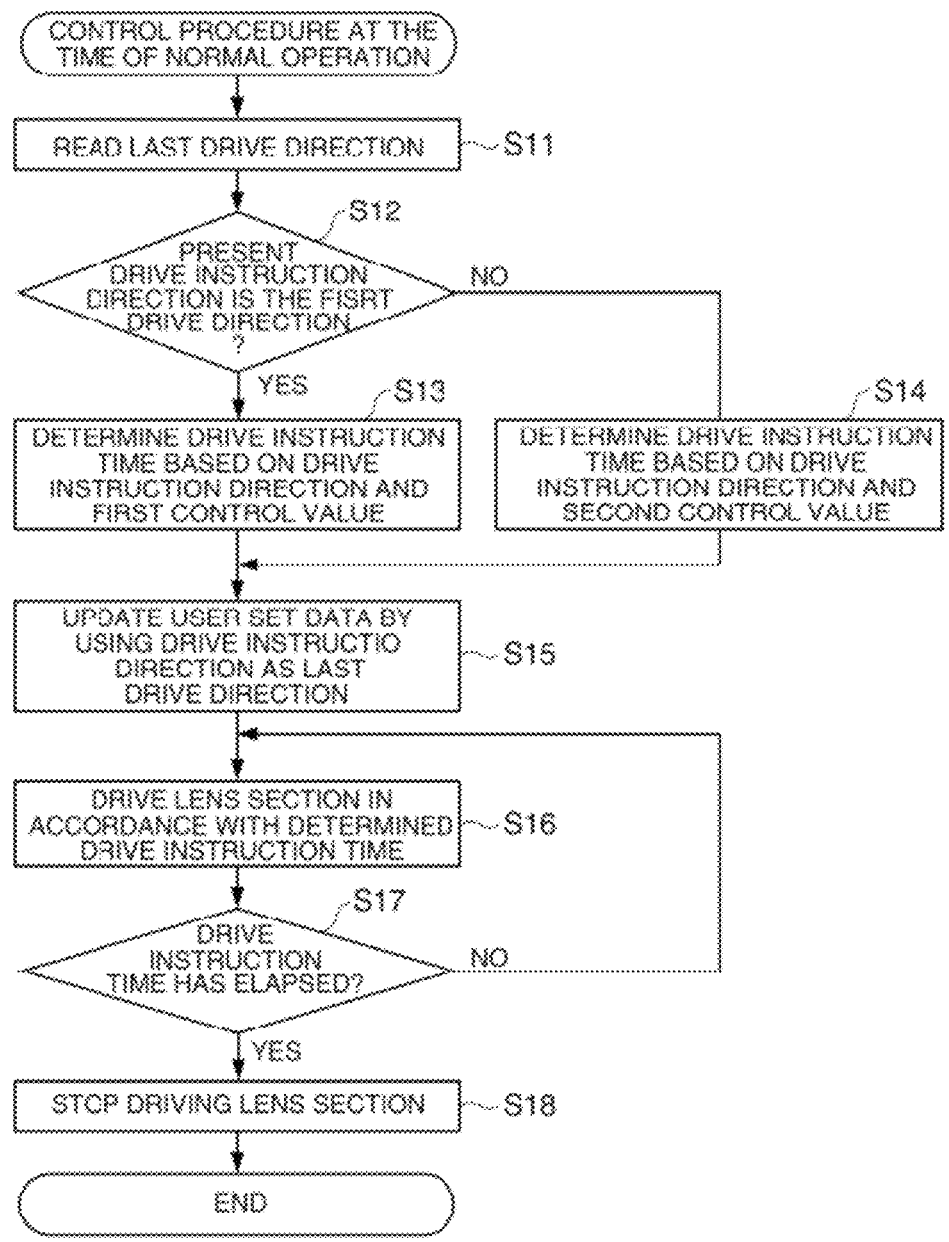
FIG. 12 is a flowchart showing an example of a control procedure at the time of normal operation in the first embodiment.

Here, a control procedure at the time of normal operation will be described. FIG. 12 is a flowchart showing an example of the control procedure at the time of normal operation in the first embodiment. When the accepting section 160 accepts the indication information indicating the drive instruction of the lens section 182 from the remote controller 400, the determining section 152 reads the last drive direction of the lens section 182 from the user set data 126 (step S11). Incidentally, as will be described later, the control section 150 stores the last drive direction of the lens section 182 in the storing section 120 as part of the user set data 126.

The determining section 152 determines whether the present drive instruction direction indicated by the indication information is a first drive direction that is same as the last drive direction or a second drive direction that is different from the last drive direction (step S12). Incidentally, in this case, the determining section 152 determines that the present drive instruction direction is the same as the last drive direction when the present drive instruction direction is virtually the same as the last drive direction (for example, when the present drive instruction direction is left and the last drive direction is upper left in a state in which lens shift drive in eight directions is implemented) even when the directions are not identical with each other.

In that case the present drive instruction direction is the first drive direction in step S12, the control section 150 determines the drive instruction time based on the drive instruction direction and the first control value determined by the control data 124 and the user set data 126 (step S13). On the other hand, in that case the present drive instruction direction is the second drive direction in step S12, the control section 150 determines the drive instruction time based on the second control value determined by the first control value (step S14).

Then, the control section 150 updates the user set data 126 by setting the present drive instruction direction as the last drive direction of the lens section 182 (step S15), and controls the lens driving section 184 so that the lens driving section 184 drives the lens section 182 in accordance with the determined drive instruction time (step S16). The control section 150 determines whether or not the drive instruction time has elapsed based on a timer value from the time measurement section 154 while the control section 150 is controlling the lens driving section 184 (step S17). If the drive instruction time has elapsed, the control section 150 makes the lens driving section 184 stop driving the lens section 182 (step S18); if the drive instruction time has not elapsed, the control section 150 makes the lens driving section 184 continue to drive the lens section 182.

As described above, according to this embodiment, the projector 100 can drive the lens section 182 in response to requests from the user by accepting the first control value indication information, determining the first control value, and driving the lens section 182 by using the first control value. Moreover, according to this embodiment, the projector 100 can reduce the influence of backlash and increase responsiveness to an instruction for lens shift etc. by driving the lens section 182 by using the second control value whose drive instruction value of the lens section 182 is greater than that of the first control value in that case the drive instruction direction is the second drive direction.

Therefore, the projector 100 can improve the convenience of the user and perform control related to the movement of the lens 995 more appropriately. For example, when an instruction for lens shift etc. is performed, the projector 100 can perform lens shift etc. in response to requests from a user who desires to make fine adjustments even if the movement of the lens is slow, a user who desires to move the lens quickly even if the movement of the lens is not smooth, and the like.

Moreover, according to this embodiment, the projector 100 projects the environmental setting image 502 showing a plurality of options with different control values and accepts the first control value indication information, whereby the user can issue an instruction by selecting an intended option in the environmental setting image 502. In this way, the projector 100 can improve the convenience of the user.

Second Embodiment

Figure 13:
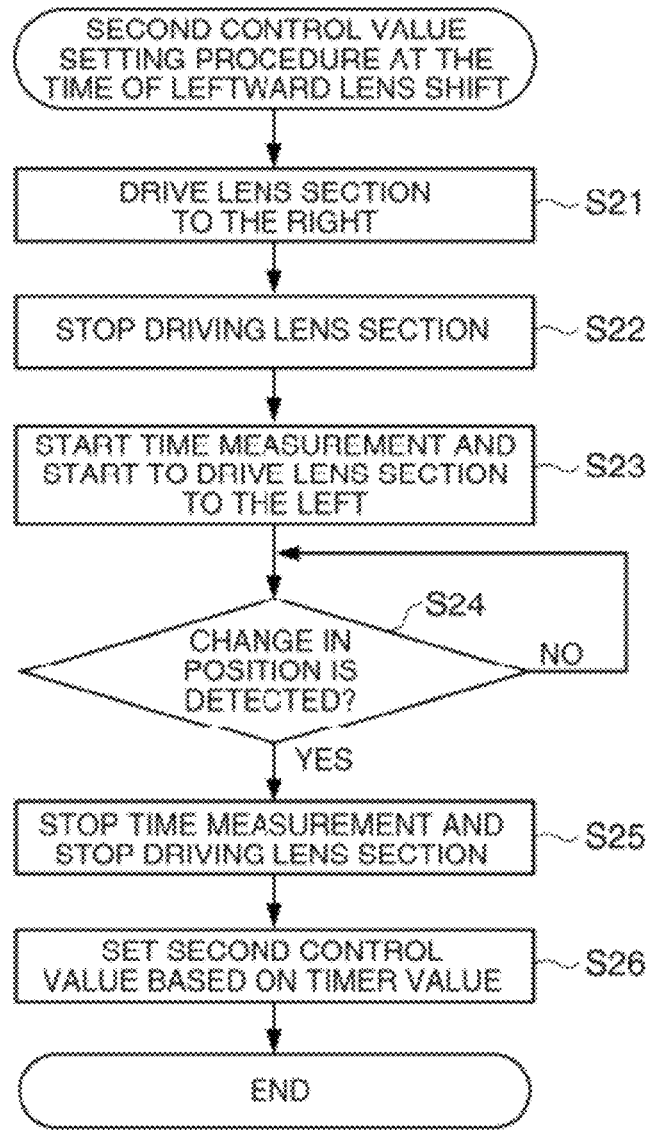
FIG. 13 is a flowchart showing an example of a second control value setting procedure at the time of leftward lens shift in a second embodiment.
Figure 14:
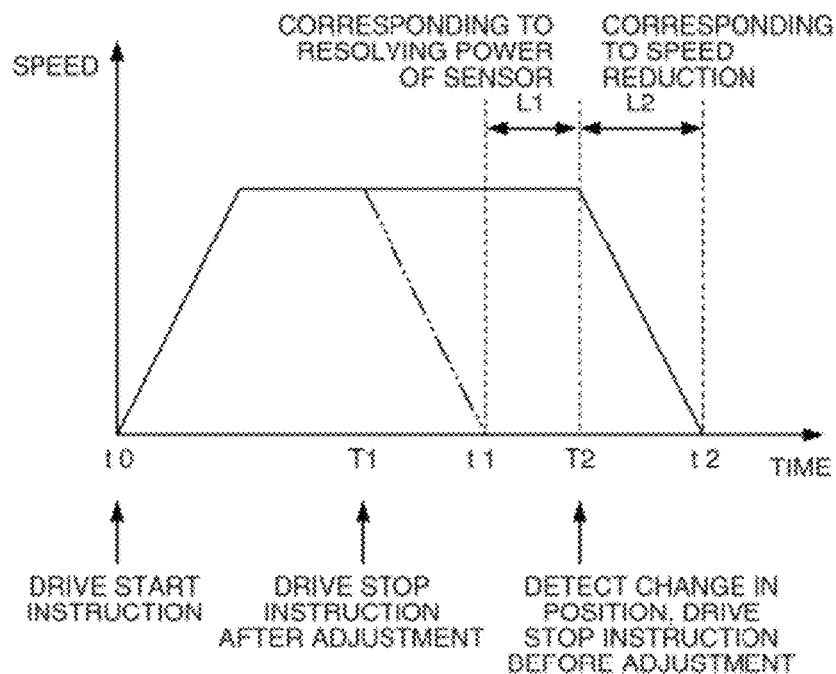
FIG. 14 is a diagram showing an example of how to determine the second control value in the second embodiment.

In the first embodiment, the projector 100 determines the second control value by using a fixed value; however, the projector 100 may determine the second control value in accordance with an actual drive status. FIG. 13 is a flowchart showing an example of a second control value setting procedure at the time of leftward lens shift in a second embodiment. Moreover, FIG. 14 is a diagram showing an example of how to determine the second control value in the second embodiment.

For example, the projector 100 may determine the second control value when performing calibration. When the second control value at the time of left lens shift, for example, is set, the control section 150 controls the lens driving section 184 and thereby temporarily drives the lens section 182 to the right (step S21) and makes the lens driving section 184 stop driving the lens section 182 (step S22).

Then, the control section 150 makes the time measurement section 154 start to perform time measurement and at the same time controls the lens driving section 184 and thereby makes the lens driving section 184 start to drive the lens section 182 to the left (step S23).

The control section 150 determines whether or not the position of the lens section 182 has changed based on the information from the position detecting section 186 (step S24). If the position of the lens section 182 has changed, the control section 150 makes the time measurement section 154 stop time measurement and at the same time controls the lens driving section 184 and thereby makes the lens driving section 184 stop driving the lens section 182 to the left (step S25).

Then, the control section 150 determines the second control value based on the timer value obtained by the time measurement performed by the time measurement section 154 (step S26). Specifically, as shown in FIG. 14, even when a point of time at which a change in the position of the lens section 182 is detected by the position detecting section 186 is T2, it includes an error L1 (a fixed value) due to the resolving power of a sensor implemented in the position detecting section 186. For example, when the sensor is 8 bit, the resolving power has only 256 levels, and this may be insufficient for control on a dot-by-dot basis or control on the millisecond time scale. Moreover, even when a drive stop instruction for the lens section 182 is issued, it takes time L2 (a fixed value) before the point of time t2 at which the lens section 182 comes to a standstill after reducing speed. Therefore, the control section 150 can determine a point of time (time) T1 as the second control value, the point of time (time) T1 obtained by subtracting, from the point of time T2, a value obtained by adding L1 and L2, for example.

As described above, according to this embodiment, since the projector 100 can determine the second control value by actually driving the lens section 182, the projector 100 can perform control related to the movement of the lens 995 more accurately.

Third Embodiment

Figure 15:
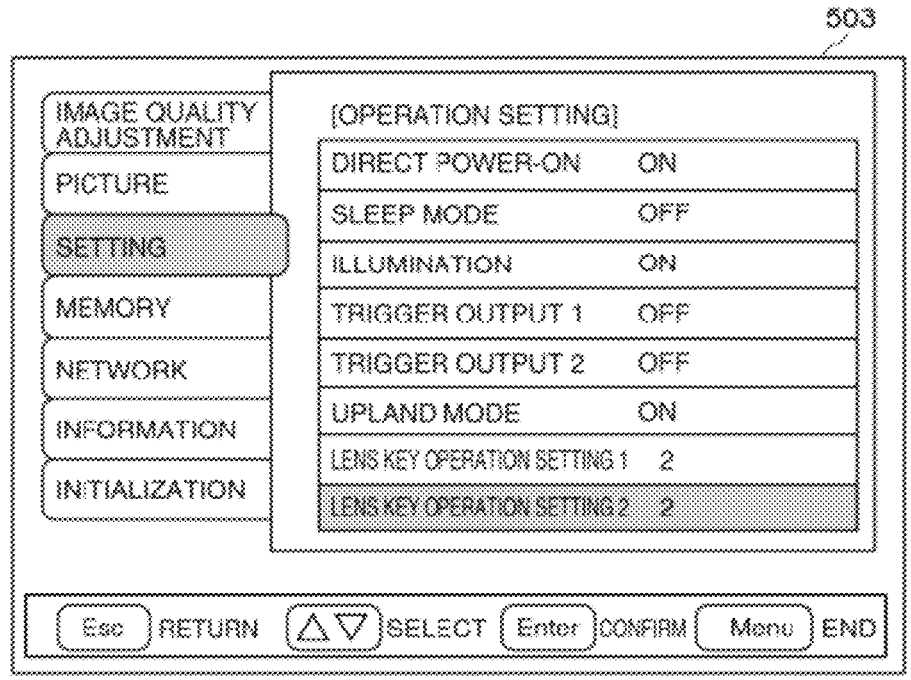
FIG. 15 is a diagram showing an example of an environmental setting image in a third embodiment.
Figure 16:
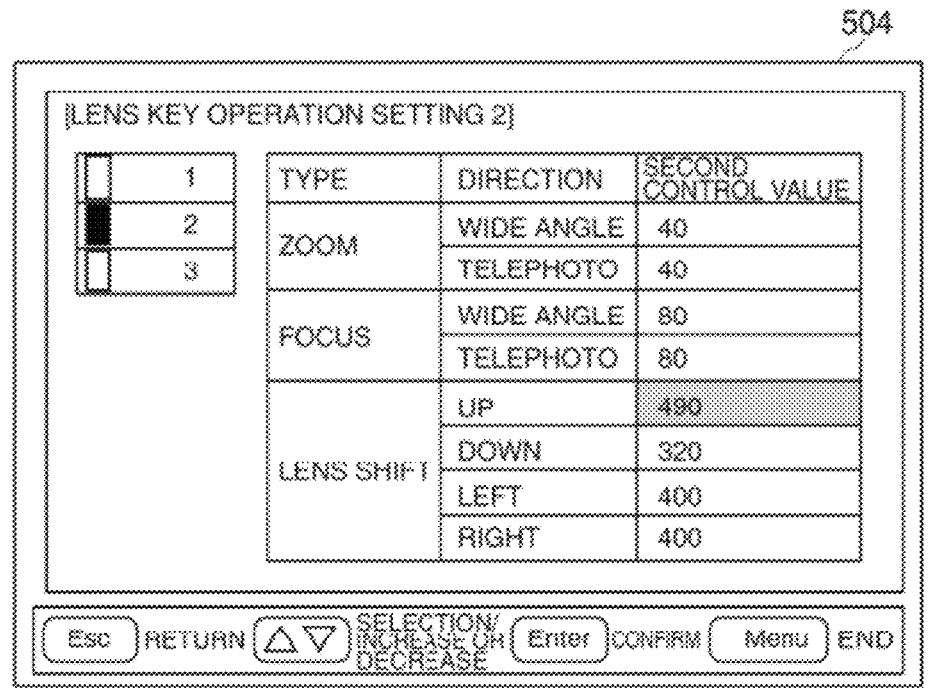
FIG. 16 is a diagram showing another example of the environmental setting image in the third embodiment.

Moreover, the projector 100 may determine the second control value in response to an instruction from the user as is the case with the first control value. Furthermore, the environmental setting image 502 is an image indirectly indicating the first control value; however, an image directly indicating the control value may be adopted. FIG. 15 is a diagram showing an example of an environmental setting image 503 in a third embodiment, and FIG. 16 is a diagram showing an example of an environmental setting image 504 in the third embodiment.

For example, the projecting section 180 projects the environmental setting image 503 including, in addition to "lens key operation setting 1" for accepting a selection of the first control value, "lens key operation setting 2" for accepting a selection of the second control value. Moreover, when "lens key operation setting 2" is selected, the projecting section 180 projects the environmental setting image 504 by which the second control value is determined for each option. The environmental setting image 504 is an image in which the second control values in accordance with a combination of an option (1 to 3), the type of lens drive, and a lens drive direction are displayed, the image that accepts a second control value adjustment instruction as a result of the user operating the remote controller 400. The control section 150 updates the second control value stored in the user set data 126 in accordance with the second control value adjustment instruction, and performs control in accordance with the updated second control value.

As described above, according to this embodiment, the projector 100 can perform control in response to requests from the user even when driving the lens section 182 in the opposite direction.

Other Embodiments

It is to be understood that application of the invention is not limited to the embodiments described above, and modifications are possible. For example, the configurations of the embodiments described above may be combined. Specifically, by combining the second embodiment and the third embodiment, for example, the projector 100 can correct the second control value determined by calibration in response to an instruction from the user.

Moreover, the control value (the drive instruction value) is not limited to a drive time and may be, for example, drive power, a drive speed, and a drive distance (a value obtained by multiplying a drive speed by a drive time). Furthermore, the projector 100 may make the user set a drive speed when the user issues an instruction whose time from when the instruction operation is turned on till when it is turned off is longer than the prescribed time, and drive the lens section 182 in accordance with the drive speed. This allows the user to perform lens shift etc. at an intended drive speed.

Furthermore, a device that outputs control value indication information to the projector 100 is not limited to the remote controller 400 and may be, for example, a portable terminal device such as a mobile telephone or a smartphone, a PC (personal computer), and a mouse. In addition, projection of the environmental setting image 503 and the like is not necessary, and control value indication information may be input to the projector 100 from a portable terminal device such as a mobile telephone.

Moreover, the projector 100 may have one or two of the three functions: zoom, focus, and lens shift, and does not need to have all of them. Furthermore, in the embodiments described above, three types (three levels) of control value are provided as selectable control values. However, two types of control value may be provided, and four or more types of control value may be provided.

In addition, the computer of the projector 100 may read a program product stored in an information storage medium and function as the control section 150 or the like. As such an information storage medium, a CD-ROM, a DVD-ROM, ROM, RAM, and an HDD, for example, can be used.

Furthermore, the projector 100 is not limited to a liquid crystal projector (a transmissive liquid crystal projector and a reflective liquid crystal projector such as LCOS) and may be, for example, a projector using a digital micromirror device. Moreover, the projecting section 180 may adopt, in place of a lamp, an organic EL device, a silicon light-emitting device, and a self light-emitting device including a solid light source such as a laser diode or an LED. In addition, the function of the projector 100 may be distributed among a plurality of devices (for example, a PC and a projector).

What is claimed is:

1. A projector, comprising:
    a lens driving section that drives a lens section having a projection lens;
    a projecting section that projects an accepting image accepting first control value indication information indicating a first control value including a drive instruction value of the lens section, the accepting image including a plurality of options to which different values are applied as the first control value;
    an accepting section that accepts the first control value indication information;
    a determining section that determines whether a drive instruction direction for the lens section is a first drive direction that is same as the last drive direction of the lens section or a second drive direction that is different from the last drive direction of the lens section; and
    a control section that
        controls the lens driving section by using the first control value for driving the lens section to the drive instruction direction by the lens driving section based on a determination by the determining section that the drive instruction direction is the first drive direction, and
        controls the lens driving section by using a second control value whose drive instruction value is greater than the drive instruction value of the first control value for driving the lens section to the drive instruction direction by the lens driving section based on a determination by the determining section that the drive instruction direction is the second drive direction.

2. The projector according to claim 1, wherein
the control section determines the second control value in accordance with the first control value.

3. The projector according to claim 1, wherein
the accepting section accepts second control value indication information indicating the second control value, and
the control section determines the second control value based on the second control value indication information.

4. The projector according to claim 1, wherein
the accepting section accepts drive indication information indicating a drive instruction for the lens section, and
the control section performs control on the lens driving section by using the first control value or the second control value in case that the time of the drive instruction accepted by the accepting section is equal to or shorter than a prescribed time,
and performs control on the lens driving section for continuously driving the lens section by the lens driving section in case that the time of the drive instruction accepted by the accepting section is longer than the prescribed time.

5. A control method in a projector including a lens driving section that drives a lens section having a projection lens, wherein
the projector
    projects an accepting image accepting the first control value indication information indicating a first control value including a drive instruction value of the lens section, the accepting image including a plurality of options to which different values are applied as the first control value,
    accepts first control value indication information,
    determines whether a drive instruction direction for the lens section is a first drive direction that is same as the last drive direction of the lens section or a second drive direction that is different from the last drive direction of the lens section, and
    controls the lens driving section by using the first control value for driving the lens section to the drive instruction direction by the lens driving section based on a determination that the drive instruction direction is the first drive direction, and controls the lens driving section by using a second control value whose drive instruction value is greater than the drive instruction value of the first control value for driving the lens section to the drive instruction direction by the lens driving section based on a determination that the drive instruction direction is the second drive direction.

* * * * *